UNITED STATES PATENT OFFICE.

JOSEPH TCHERNIAC, OF STREATHAM HILL, LONDON, ENGLAND.

MANUFACTURE OF SULFOCYANID.

No. 862,678.   Specification of Letters Patent.   Patented Aug. 6, 1907.

Application filed November 19, 1906. Serial No. 344,119.

*To all whom it may concern:*

Be it known that I, JOSEPH TCHERNIAC, a subject of the Emperor of Germany, residing at 41 Kirkstall road, Streatham Hill, in the county of London, England, consulting chemist, have invented certain new and useful Improvements in the Manufacture of Sulfocyanids, of which the following is a specification.

A known method of absorbing cyanogen compounds from coal gas or like gas consists in passing the crude gas, preferably cooled and deprived of tar, through a suitable washer or scrubber containing milk of lime and sulfur.

I have found that if it be desired to produce calcium sulfocyanid, or another sulfocyanid other than ammonium sulfocyanid, the above process is unsatisfactory, because the ammonia in the crude gas produces a large proportion of ammonium sulfocyanid the separation of which from the other sulfocyanid or sulfocyanids is difficult or costly. Moreover, much of the lime is lost as carbonate when the crude gas containing ammonia is passed through the washer.

According to my invention the crude gas is purified from its ammonia in the usual manner before it is passed through the washer containing the lime and sulfur.

It might be supposed that the lime ought to be present in very large excess in order that the sulfur may be completely converted into sulfocyanid; for in crude coal gas, freed from ammonia, the proportion of hydrocyanic acid to carbon dioxid is about 1:8 by volume. I find however, that under these conditions the reaction of the hydrocyanic acid of the crude gas with lime and sulfur is so to say instantaneous, whereas the absorption of the carbon dioxid by the lime requires a longer time. Thus the excess of lime used need only be about two-thirds more than represented by the proportion $2S:CaO$.

In practice, slaked lime and finely divided sulfur, the former in the aforesaid excess, are introduced together with the necessary amount of water into any known form of washer or scrubber preferably having means for agitating the liquid, and the gas, freed from ammonia but still containing sulfureted hydrogen, is passed through the mixture in a systematic manner until all the free sulfur, or sulfur dissolved as polysulfid has entered into combination. This point is easily detected, inasmuch as when it is attained, the small quantity of iron sulfid which is inevitably present becomes converted into ferro-cyanid, so that the greenish black color of the mixture passes to a greenish yellow.

If the right proportion of lime to sulfur has been used, there will now be very little calcium hydrosulfid dissolved in the liquor, which can be easily freed from what there is by further contact with the gas. The mixture may then be directly filtered to yield a solution of practically pure calcium sulfocyanid. Highly concentrated solutions, such as contain 30 per cent of sulfocyanogen and upwards, may be obtained by this process by using an amount of water for slaking the lime and diluting the mixture in suitable proportion to the quantity of sulfur to be introduced into the washer, and also by using instead of pure water the water with which the mud filtered from the washer liquor has been washed.

Other sulfocyanids can be manufactured by this process in a direct manner by adding to the mixture of lime and sulfur in the above proportions, at the beginning of the operation, a salt capable of double decomposition with the calcium sulfocyanid, for instance the sulfate or bisulfate of soda. If the latter be used the quantity of lime must be correspondingly increased. As with the calcium salt, highly concentrated solutions can be obtained by the same means and also by using the concentrated solutions of the sulfate for slaking the lime.

Instead of a mixture of sulfur and lime, a mixture of calcium polysulfid with a corresponding excess of lime may be used.

Having thus described the nature of my said invention and the best means I know of carrying the same into practical effect, I claim:—

1. A process for the manufacture of sulfocyanids which process consists in first purifying crude gas from ammonia and then passing the purified gas through a liquid containing lime and sulfur in the proportion about $5CaO:6S$.

2. A process for the manufacture of sulfocyanids which process consists in first purifying crude gas from ammonia, then passing the purified gas through a liquid containing the alkali salt of an acid which forms an insoluble calcium salt, and lime and sulfur in the proportion about $5CaO:6S$.

3. A process for the manufacture of sulfocyanids which process consists in first slaking lime with a solution of an alkali salt of an acid which forms an insoluble calcium salt, then suspending the lime and some sulfur in the proportion about $5CaO:6S$ in water and finally passing crude gas purified from ammonia through the liquid.

In testimony whereof I have signed my name to this specification in the presence of two subscribing witnesses.

JOSEPH TCHERNIAC.

Witnesses:
 JOSEPH WILLARD,
 CHAS. S. RUTLIDGE.